US009477928B2

(12) United States Patent
Rajan et al.

(10) Patent No.: US 9,477,928 B2
(45) Date of Patent: Oct. 25, 2016

(54) SYSTEM AND METHOD FOR COMPARING SOFTWARE FRAMEWORKS

(75) Inventors: Sreeranga P. Rajan, Sunnyvale, CA (US); Indradeep Ghosh, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 1719 days.

(21) Appl. No.: 12/835,994

(22) Filed: Jul. 14, 2010

(65) Prior Publication Data

US 2012/0017201 A1 Jan. 19, 2012

(51) Int. Cl.
*G06F 9/44* (2006.01)
*G06N 7/00* (2006.01)
*G06F 11/36* (2006.01)

(52) U.S. Cl.
CPC ............ *G06N 7/00* (2013.01); *G06F 11/3604* (2013.01)

(58) Field of Classification Search
CPC .......................... G06N 7/00; G06F 11/3608
USPC ........ 717/132, 140, 151, 156; 716/113, 118, 716/52, 104, 122; 713/176; 726/1
See application file for complete search history.

(56) References Cited

U.S. PATENT DOCUMENTS

| | | | |
|---|---|---|---|
| 6,064,819 A * | 5/2000 | Franssen et al. ............. | 717/156 |
| 6,078,745 A * | 6/2000 | De Greef et al. ............. | 717/151 |
| 7,475,000 B2 * | 1/2009 | Cook et al. ................... | 703/14 |
| 2005/0114850 A1 * | 5/2005 | Chheda et al. ............... | 717/151 |
| 2006/0236310 A1 * | 10/2006 | Domeika et al. ............. | 717/140 |
| 2009/0125976 A1 * | 5/2009 | Wassermann et al. ........ | 726/1 |
| 2010/0125832 A1 | 5/2010 | Prasad et al. | |

OTHER PUBLICATIONS

Chen et al, "ILP-based Scheme for Timing Variation-aware Scheduling and Resource Binding", IEEE 2008, pp. 27-30,<ILP_Chen08.pdf>.*
Wu et al, "Generic ILP-Based Approaches for Time-Multiplexed FPGA Partitioning" IEEE 2001, Oct. 1, pp. 1266-1274 <ILP_Fpga_01.pdf>.*
Extended European Search Report; Application No. 11174017.1-1225; pp. 9, Feb. 6, 2012.
Benhamamouch et al.; "Computing worst case execution time (WCET) by Symbolically Executing a time-accurate Hardware Model"; Proceeding of the International MultiConference of Engineers and Computer Scientists 2009, vol. II; pp. 6, Mar. 2009.

(Continued)

*Primary Examiner* — Tuan Vu
(74) *Attorney, Agent, or Firm* — Baker Botts L.L.P.

(57) ABSTRACT

In one embodiment, a method may include symbolically executing application code on a first framework. The method may also include creating a first model based on the symbolic execution of the first framework. The method may additionally include symbolically executing the application code on a second framework. The method may further include creating a second model based on the symbolic execution of the first framework. The method may also include determining one or more parameters associated with the first framework based on the first model. The method may additionally include determining one or more parameters associated with the second framework based on the second model. The method may also include selecting one of the first framework and the second framework as a desired framework for execution of the application code based on a comparison of the one or more parameters associated with the first framework and the one or more parameters associated with the second framework.

21 Claims, 2 Drawing Sheets

(56) References Cited

OTHER PUBLICATIONS

Saxena et al.; "A Symbolic Execution Framework for JavaScript"; 2010 IEEE Symposium on Security and Privacy; pp. 513-528.
Peter Velichkov; "Mootools vs JQuery vs Prototype vs YUI vs Dojo Comparison Revised"; Peter Velichkov's Blog; http://blog,creonfx.com/javascript/mootools-vs-jquery-vs-prototype-vs-yui-vs-dojo-comparison-revised ; pp. 12, Feb. 3, 2009.
Joe Lennon; "Compare JavaScript framework: An overview of the frameworks that greatly enhance JavaScript development"; IBM; ibm.com/developerWorks ; pp. 23, Feb. 2, 2010.
European Office Action; Application No. 11174017.1, 7 pages, Sep. 11, 2015.

* cited by examiner

US 9,477,928 B2

SYSTEM AND METHOD FOR COMPARING SOFTWARE FRAMEWORKS

TECHNICAL FIELD

The present disclosure relates generally to testing software.

BACKGROUND

In developing Web applications, developers often use JavaScript. JavaScript is a language standard that is typically used to enable programmatic access to computational objects within a host environment. It may be characterized as a prototype-based object-oriented scripting language that is dynamic, weakly typed and has first-class functions. JavaScript is primarily used in the form of client-side JavaScript, implemented as part of a Web browser in order to provide enhanced user interfaces and dynamic websites.

In developing JavaScript applications, developers may choose from multiple JavaScript frameworks. Examples of JavaScript frameworks are Dojo, Yahoo! User Interface (YUI), and others. Generally speaking, a framework is an abstraction in which common code providing generic functionality can be selectively overridden or specialized by user code providing specific functionality. Frameworks are a special case of software libraries in that they are reusable abstractions of code wrapped in a well-defined application programming interface (API), yet they contain some key distinguishing features that separate them from normal libraries. Among these distinguishing features are inversion of control (e.g., in a framework, unlike in libraries or normal user applications, the overall program's flow of control is not dictated by the caller, but by the framework), default behavior (e.g., a framework has a default behavior), extensibility (e.g., a framework can be extended by the user usually by selective overriding or specialized by user code providing specific functionality, and non-modifiable framework code (e.g., framework code, in general, is not allowed to be modified; users can extend the framework, but not modify its code).

Despite the many choices of frameworks, developers are often not able to determine which of the frameworks may be more desirable to use (e.g., which framework will execute faster, the number of inputs required, the number of constraints, etc.).

SUMMARY

The present invention provides a method and a system for comparing software frameworks that substantially eliminates or reduces at least some of the disadvantages and problems associated with previous methods and systems.

In accordance with a particular embodiment of the present invention, a method may include symbolically executing application code on a first framework. The method may also include creating a first model based on the symbolic execution of the first framework. The method may additionally include symbolically executing the application code on a second framework. The method may further include creating a second model based on the symbolic execution of the first framework. The method may also include determining one or more parameters associated with the first framework based on the first model. The method may additionally include determining one or more parameters associated with the second framework based on the second model. The method may also include selecting one of the first framework and the second framework as a desired framework for execution of the application code based on a comparison of the one or more parameters associated with the first framework and the one or more parameters associated with the second framework.

Technical advantages of particular embodiments of the present invention include a methodology whereby software frameworks may be compared.

Other technical advantages will be readily apparent to one skilled in the art from the following figures, descriptions, and claims. Moreover, while specific advantages have been enumerated above, various embodiments may include all, some or none of the enumerated advantages.

DESCRIPTION OF EXAMPLE EMBODIMENTS

Figure 1:
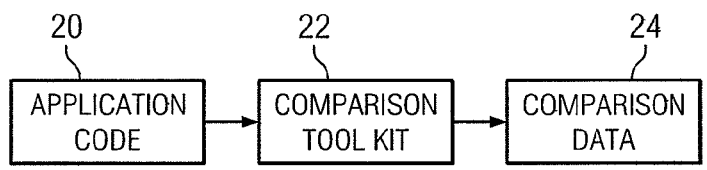
FIG. 1 illustrates an example environment of a comparison toolkit, in accordance with the present disclosure.

FIG. 1 illustrates an example environment 10 of a comparison toolkit 22. In particular embodiments, comparison toolkit 22 facilitates the comparison of frameworks for use in connection with an application code 20, testing a plurality of frameworks to produce comparison data 24 which may include information regarding which of the frameworks may be more desirable for use by a developer, or may include information that a developer may review to determine which framework may be more desirable. Components of example environment 10 may execute or operate within one or more computer systems, such as those described in more detail below with reference to FIG. 4.

Application 20 may include any program of instructions operable to, when executed by a processor, perform one or more tasks (e.g., render at least a portion of a Web application). In some embodiments, application 20 may be written in JavaScript code.

Figure 2:
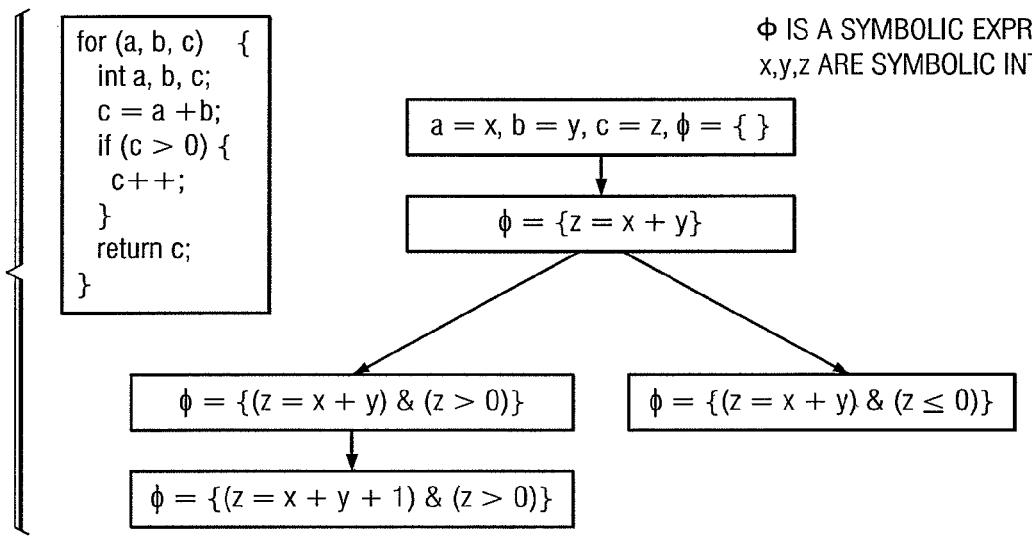
FIG. 2 illustrates example symbolic execution model checking, in accordance with the present disclosure.

As described above, comparison toolkit 22 may compare execution of application code 20 on at least two or more frameworks. In certain embodiments, the frameworks may include JavaScript frameworks (e.g., DoJo, YUI, etc.). In these and other embodiments, comparison toolkit 22 may compare frameworks by applying application code 20 to each framework using symbolic execution. FIG. 2 illustrates example symbolic execution. As shown in FIG. 2, each path in the tree represents a (possibly infinite) set of execution paths. To check the property if $((a>1)\&(b>0)) \rightarrow (c>2)$ using symbolic execution as FIG. 2 illustrates, the property may be negated (the negation being if $((a>1)\&(b>0)) \rightarrow (c \leq 2)$) and the negation may be checked at the end of each path of the symbolic execution. For the execution path ending with $\phi = \{(z=x+y)\&(z \leq 0)\}$, an integer linear programming (ILP) solver or a solver using another suitable decision procedure may attempt to find a solution to the following first set of equations: $x>1$; $y>0$; $z=x+y$; $z \leq 0$; and $z \leq 2$. For the execution path ending with $\phi = \{(z=x+y+1)\&(z \leq 0)\}$, an ILP solver or a solver using another suitable decision procedure may attempt to find a solution to the following second set of equations: $x>1$; $y>0$; $z=x+y+1$; $z \leq 0$; and $z \leq 2$. In both sets of equations, the first two equations, x>1 and y>0, may be preconditions and the last equation, z≤2, may be a post condition. If no solution is found for the first or second set of equations, the property if ((a>1)&(b>0))→(c>2) is true. If a solution is found for the first or second set of equations, the property is false and the solution is a counter example violating the property.

Based on the symbolic executions of the application code 20 on the plurality of frameworks, comparison toolkit 22 may create a model (e.g., control flow graph, tree, or another representation) for each framework execution. Comparison toolkit 22 may, based on each model, determine one or more parameters for each framework execution. In some embodiments, such parameters may be output by comparison toolkit 22 as comparison data 24. The one or more parameters may include estimated execution time for the application code 20 using the framework, number of inputs required for the execution of the application code 20 using the framework, number of constraints of the execution of the application code 20 using the framework, or any other suitable parameter.

In some embodiments, comparison toolkit 22 may determine a desired framework to be used for the application code 20 based on the one or more parameters (e.g., comparison toolkit 22 may select the framework that provides the fastest execution of application code 20). In certain of these embodiments, the determination of the desired framework may be output by comparison toolkit 22 as a portion of comparison data 24. In other embodiments, a developer of application code 20 or another person may determine a desired framework based on analysis of the one or more parameters.

Figure 3:
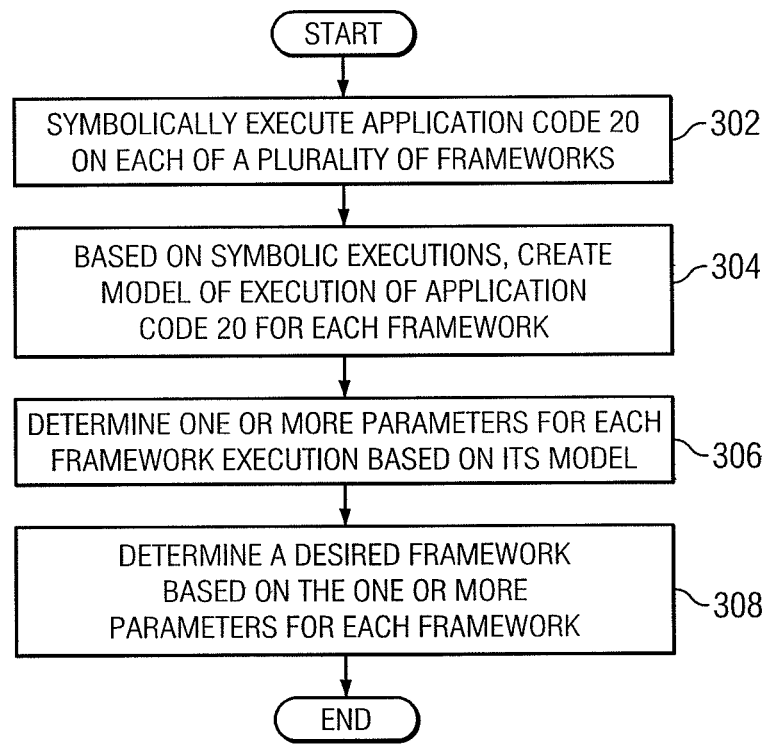
FIG. 3 illustrates a flow chart of an example method for comparing software frameworks, in accordance with the present disclosure.

FIG. 3 illustrates a flow chart of an example method 300 for comparing software frameworks, in accordance with certain embodiments of the present disclosure. According to one embodiment, method 300 may begin at step 302. As noted above, teachings of the present disclosure may be implemented in a variety of configurations of environment 10. As such, the preferred initialization point for method 300 and the order of the steps 302-308 comprising method 300 may depend on the implementation chosen.

At step 302, comparison toolkit 22 may symbolically execute application code 20 on each of a plurality of frameworks.

At step 304, based on the symbolic executions of the application code 20 on the plurality of frameworks, comparison toolkit 22 may create a model (e.g., control flow graph, tree, or another representation) for each framework execution.

At step 306, comparison toolkit 22 may, based on each model, determine one or more parameters for each framework execution.

At step 308, comparison toolkit 22 and/or a developer of application code 20 may determine a desired framework to be used for the application code 20 based on the one or more parameters (e.g., comparison toolkit 22 may select the framework that provides the fastest execution of application code 20).

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using environment 10 or any other system operable to implement method 300. In certain embodiments, method 300 may be implemented partially or fully in software and/or firmware embodied in computer-readable media.

Figure 4:
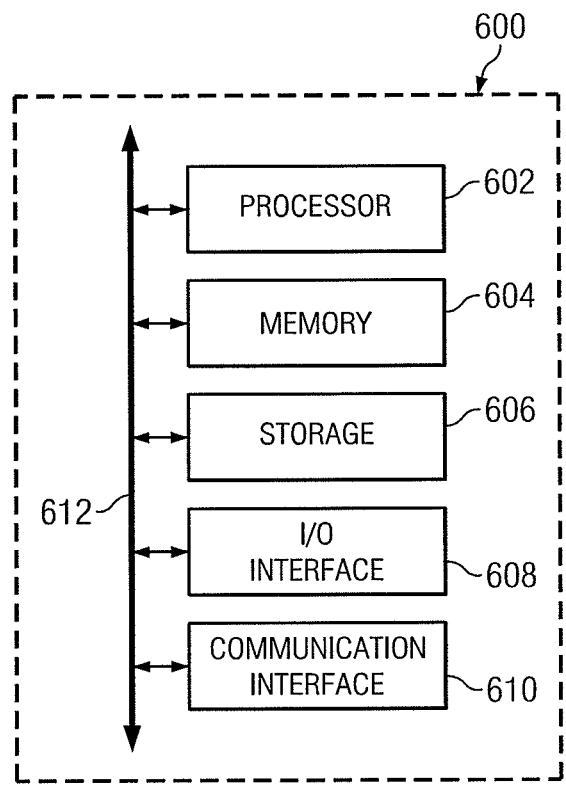
FIG. 4 illustrates an example computer system, in accordance with the present disclosure.

FIG. 4 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

A component of example environment 10 may include logic and/or other suitable element. Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

Although the present invention has been described in detail with specific components being identified, various changes and modifications may be suggested to one skilled in the art and, further, it is intended that the present invention encompass any such changes and modifications as clearly falling within the scope of the appended claims.

Note also that, with respect to specific process flows disclosed, any steps discussed within the flows may be modified, augmented, or omitted without departing from the scope of the invention. Additionally, steps may be performed in any suitable order, or concurrently, without departing from the scope of the invention.

Numerous other changes, substitutions, variations, alterations, and modifications may be ascertained to one skilled in the art and it is intended that the present invention encompass all such changes, substitutions, variations, alterations, and modifications as falling within the scope of the appended claims.

We claim:

1. A method, implemented with a processor and storage device having instructions stored thereon, wherein the instructions when executed by the processor, cause the processor to perform the method steps, comprising:
    symbolically executing application code on a first framework, a framework comprising an abstraction in which common code providing generic functionality can be specialized by user code providing specific functionality;
    creating a first model based on the symbolic execution of the first framework;
    symbolically executing the application code on a second framework;
    creating a second model based on the symbolic execution of the second framework;
    based on the first model, determining one or more parameters associated with the first framework;
    based on the second model, determining one or more parameters associated with the second framework; and
    based on a comparison of the one or more parameters associated with the first framework and the one or more parameters associated with the second framework, selecting one of the first framework and the second framework as a desired framework for execution of the application code.

2. A method according to claim 1, wherein the application code is written in JavaScript.

3. A method according to claim 1, wherein at least one of the first framework and the second framework is a JavaScript framework.

4. A method according to claim 1, wherein at least one of the first model and the second model is a control flow graph.

5. A method according to claim 1, wherein at least one of the one or more parameters associated with the first framework and the one or more parameters associated with the second framework is an execution time of the application code when the application code is applied to the respective framework.

6. A method according to claim 1, wherein at least one of the one or more parameters associated with the first framework and the one or more parameters associated with the second framework is a number of inputs required for execution of the application code when the application code is applied to the respective framework.

7. A method according to claim 1, wherein at least one of the one or more parameters associated with the first framework and the one or more parameters associated with the second framework is a number of constraints present in execution of the application code when the application code is applied to the respective framework.

8. One or more computer-readable tangible storage media encoding software that is operable when executed to:
  symbolically execute application code on a first framework, a framework comprising an abstraction in which common code providing generic functionality can be specialized by user code providing specific functionality;
  create a first model based on the symbolic execution of the first framework;
  symbolically execute the application code on a second framework;
  create a second model based on the symbolic execution of the second framework;
  based on the first model, determine one or more parameters associated with the first framework;
  based on the second model, determine one or more parameters associated with the second framework; and
  based on a comparison of the one or more parameters associated with the first framework and the one or more parameters associated with the second framework, select one of the first framework and the second framework as a desired framework for execution of the application code.

9. Media according to claim 8, wherein the application code is written in JavaScript.

10. Media according to claim 8, wherein at least one of the first framework and the second framework is a JavaScript framework.

11. Media according to claim 8, wherein at least one of the first model and the second model is a control flow graph.

12. Media according to claim 8, wherein at least one of the one or more parameters associated with the first framework and the one or more parameters associated with the second framework is an execution time of the application code when the application code is applied to the respective framework.

13. Media according to claim 8, wherein at least one of the one or more parameters associated with the first framework and the one or more parameters associated with the second framework is a number of inputs required for execution of the application code when the application code is applied to the respective framework.

14. Media according to claim 8, wherein at least one of the one or more parameters associated with the first framework and the one or more parameters associated with the second framework is a number of constraints present in execution of the application code when the application code is applied to the respective framework.

15. A non-transitory computer-readable medium comprising logic configured to be executed by a computer, the logic comprising:
  logic for symbolically executing application code on a first framework, a framework comprising an abstraction in which common code providing generic functionality can be specialized by user code providing specific functionality;
  logic for creating a first model based on the symbolic execution of the first framework;
  logic for symbolically executing the application code on a second framework;
  logic for creating a second model based on the symbolic execution of the second framework;
  logic for determining one or more parameters associated with the first framework based on the first model;
  logic for determining one or more parameters associated with the second framework based on the second model; and
  logic for selecting one of the first framework and the second framework as a desired framework for execution of the application code based on a comparison of the one or more parameters associated with the first framework and the one or more parameters associated with the second framework.

16. A non-transitory computer-readable medium according to claim 15, wherein the application code is written in JavaScript.

17. A non-transitory computer-readable medium according to claim 15, wherein at least one of the first framework and the second framework is a JavaScript framework.

18. A non-transitory computer-readable medium according to claim 15, wherein at least one of the first model and the second model is a control flow graph.

19. A non-transitory computer-readable medium according to claim 15, wherein at least one of the one or more parameters associated with the first framework and the one or more parameters associated with the second framework is an execution time of the application code when the application code is applied to the respective framework.

20. A non-transitory computer-readable medium according to claim 15, wherein at least one of the one or more parameters associated with the first framework and the one or more parameters associated with the second framework is a number of inputs required for execution of the application code when the application code is applied to the respective framework.

21. A non-transitory computer-readable medium according to claim 15, wherein at least one of the one or more parameters associated with the first framework and the one or more parameters associated with the second framework is a number of constraints present in execution of the application code when the application code is applied to the respective framework.

* * * * *